Z. DIXON.
Tea-Kettle Covers.

No. 116,035.            Patented June 20, 1871.

Witnesses.        Inventor.

116,035

UNITED STATES PATENT OFFICE.

ZOHRAB DIXON, OF BRISTOL, ILLINOIS.

IMPROVEMENT IN TEA-KETTLE COVERS.

Specification forming part of Letters Patent No. 116,035, dated June 20, 1871.

*To all whom it may concern:*

Be it known that I, ZOHRAB DIXON, of Bristol, in the county of Kendall and State of Illinois, have invented a new and useful Improvement in Tea-Kettle Covers; and I do hereby declare the following to be a full, clear, and exact description thereof, which will enable others skilled in the art to make and use the same, reference being had to the accompanying drawing forming part of this specification, in which—

Figure 1:
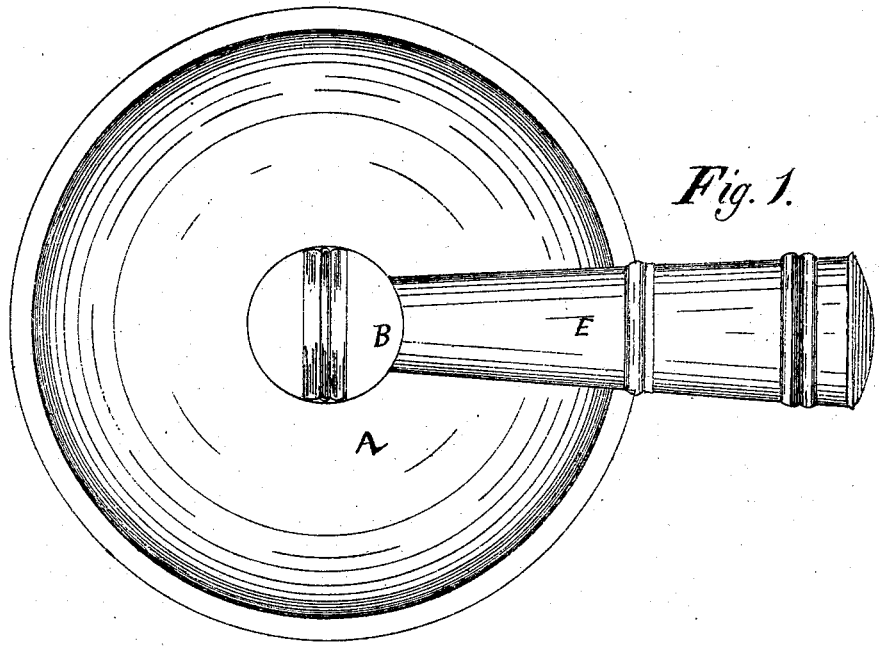
Figure 2:
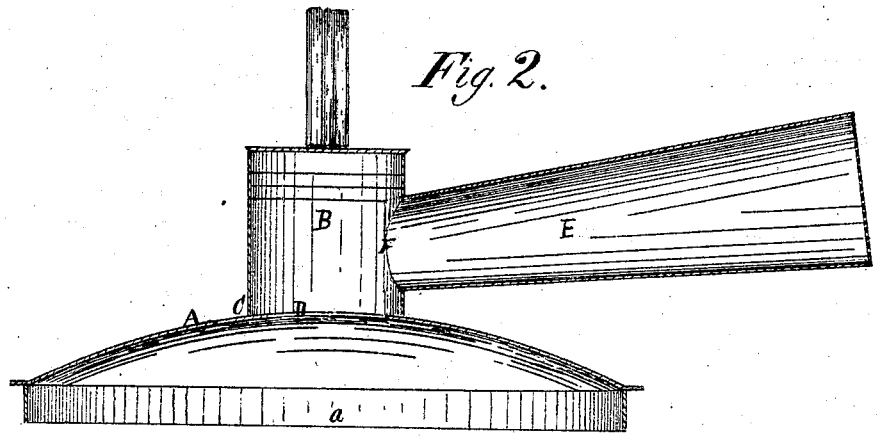
Figure 3:
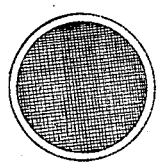

Figure 1 is a top view of a tea-kettle cover, showing my improvement. Fig. 2 is a vertical central section of the same, and Fig. 3 is an end view of the exhaust-pipe employed.

Similar letters of reference indicate like parts in the several figures of the drawing.

My invention consists in providing the cover of a tea-kettle with an exhaust-pipe so arranged as to admit of a free escape of the steam and to prevent the cover from being raised by the action of the steam.

In the drawing, A represents the cover, which is provided with a non-corrosive rim, *a*. B is a cylindrical case, which is firmly secured to the center of the cover, as shown at C. The case is made steam-tight at its upper end, and is provided at its lower end with an opening communicating with the kettle through the cover, as shown at D. E is an exhaust-pipe, which is firmly secured to the said case at a point near its center vertically, and communicates with the inner side of the same through an opening formed in the side of the case, as shown at F. Firmly affixed upon or over the outer end of the said exhaust-pipe is a covering of wire-cloth or other suitable textile material that will admit of a free escape of the steam. Thus, as steam is generated in the kettle it escapes through the exhaust-pipe without raising the cover, so that the kettle can be the more readily handled without danger of burning the hand by steam. In providing the cover A with the non-corrosive rim *a*, when said cover is made of tin, the same is less liable to rust and consequently more durable.

Having thus described my invention, what I claim as new, and desire to secure by Letters Patent, is—

1. In combination with the cover A, the case B and exhaust-pipe E, the whole arranged substantially as and for the purpose described.

2. In combination with the cover A, provided with the exhaust-pipe E and case B, the non-corrosive rim *a*, arranged substantially as and for the purpose described.

The foregoing specification of my invention signed by me this 15th day of April, A. D. 1871.

ZOHRAB DIXON.

Witnesses:
  N. C. GRIDLEY,
  N. H. SHERBURN.